US011512656B2

(12) United States Patent
Baaqel et al.

(10) Patent No.: US 11,512,656 B2
(45) Date of Patent: Nov. 29, 2022

(54) OXYCOMBUSTION ENGINE SYSTEMS INCLUDING RECIRCULATION MANAGEMENT FEATURES

(71) Applicant: Saudi Arabian Oil Company, Dhahran (SA)

(72) Inventors: Husain A. Baaqel, Dhahran (SA); Esam Z. Hamad, Brighton, MI (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/071,325

(22) Filed: Oct. 15, 2020

(65) Prior Publication Data

US 2022/0120228 A1 Apr. 21, 2022

(51) Int. Cl.
*F02D 41/00* (2006.01)
*F02M 26/19* (2016.01)
(Continued)

(52) U.S. Cl.
CPC ....... *F02D 41/0047* (2013.01); *B01D 53/002* (2013.01); *B01D 53/02* (2013.01);
(Continued)

(58) Field of Classification Search
CPC ............. F02D 41/0047; F02D 41/0027; F02D 2200/021; F02D 2200/703; F02M 26/19;
(Continued)

(56) References Cited

U.S. PATENT DOCUMENTS 1,597,924 A * 8/1926 Powell .................... F02B 43/00
123/69 V
3,267,661 A * 8/1966 Petrie ...................... F02B 41/06
60/598
(Continued)

FOREIGN PATENT DOCUMENTS

DE 102004020450 A1 11/2005
EP 2685063 A1 1/2014
(Continued)

OTHER PUBLICATIONS

Notification of Transmittal of the International Search Report and the Written Opinion of the International Searching Authority, or the Declaration dated Apr. 29, 2022 pertaining to International application No. PCT/US2021/054682 filed Oct. 13, 2021, pp. 1-21.

*Primary Examiner* — Phutthiwat Wongwian
*Assistant Examiner* — Sherman D Manley
(74) *Attorney, Agent, or Firm* — Dinsmore & Shohl LLP (57) ABSTRACT

A method for operating an oxycombustion engine system includes passing a nitrogen-depleted gas, a fuel, and a recycled exhaust gas into a combustion chamber, combusting a mixture of the nitrogen-depleted gas, the fuel, and the recycled exhaust gas, thereby producing an exhaust gas including carbon dioxide, detecting a pressure of the recycled exhaust gas passed to the combustion chamber, determining whether the detected pressure of the recycled exhaust gas is less than a configurable pressure threshold, and in response to determining that the detected pressure of the recycled exhaust gas is less than the configurable pres-
(Continued)

sure threshold, increasing the pressure of the recycled exhaust gas passed to the combustion chamber.

20 Claims, 5 Drawing Sheets (51) Int. Cl.
| | |
|---|---|
| F02M 26/34 | (2016.01) |
| F02M 26/35 | (2016.01) |
| F02M 26/37 | (2016.01) |
| F02M 26/47 | (2016.01) |
| B01F 23/10 | (2022.01) |
| B01F 25/421 | (2022.01) |
| B01D 53/00 | (2006.01) |
| B01D 53/02 | (2006.01) |
| B01D 53/26 | (2006.01) |
| B60Q 9/00 | (2006.01) |
| F02M 35/02 | (2006.01) |

(52) U.S. Cl.
CPC ............ *B01D 53/265* (2013.01); *B01F 23/10* (2022.01); *B01F 25/4231* (2022.01); *B60Q 9/00* (2013.01); *F02D 41/0027* (2013.01); *F02M 26/19* (2016.02); *F02M 26/34* (2016.02); *F02M 26/35* (2016.02); *F02M 26/37* (2016.02); *F02M 26/47* (2016.02); *F02M 35/0218* (2013.01); *B01D 2256/12* (2013.01); *B01D 2257/102* (2013.01); *B01D 2257/80* (2013.01); *F02D 2200/021* (2013.01); *F02D 2200/703* (2013.01)

(58) Field of Classification Search
CPC ........ F02M 26/34; F02M 26/35; F02M 26/37; F02M 26/47; F02M 35/0218; B01D 53/002; B01D 53/02; B01D 53/265; B01D 2256/12; B01D 2257/102; B01D 2257/80; B01F 23/10; B01F 25/4231; B60Q 9/00
See application file for complete search history.

(56) References Cited

U.S. PATENT DOCUMENTS

| | | | | |
|---|---|---|---|---|
| 4,212,163 A * | 7/1980 | Mikina | ...................... | F02G 3/02 |
| | | | | 137/624.17 |
| 4,783,966 A * | 11/1988 | Aldrich | ............... | F01L 13/0015 |
| | | | | 60/621 |
| 5,779,879 A | 7/1998 | Dieterich et al. | | |
| 6,055,808 A | 5/2000 | Poola et al. | | |
| 6,352,068 B1 * | 3/2002 | Jacobsen | .................. | F01N 3/08 |
| | | | | 123/585 |
| 7,415,947 B2 * | 8/2008 | Zajac | ...................... | F01B 31/14 |
| | | | | 123/70 R |
| 7,434,551 B2 * | 10/2008 | Zajac | ...................... | F02B 41/06 |
| | | | | 123/70 R |
| 8,196,395 B2 * | 6/2012 | Fong | ...................... | F15B 15/20 |
| | | | | 60/370 |
| 8,371,103 B2 * | 2/2013 | Zajac | ...................... | F02B 41/08 |
| | | | | 251/298 |
| 9,175,591 B2 * | 11/2015 | Hamad | ................ | F01N 3/0857 |
| 9,180,401 B2 * | 11/2015 | Hamad | ............ | B01D 53/1475 |
| 9,222,480 B2 * | 12/2015 | Younes | .................. | F04D 27/00 |
| 9,486,733 B2 * | 11/2016 | Hamad | ............. | B01D 53/1493 |
| 9,488,100 B2 * | 11/2016 | Hamad | ............ | F02M 35/10373 |
| 9,869,241 B2 * | 1/2018 | Zajac | ...................... | F02B 43/04 |
| 10,106,430 B2 * | 10/2018 | Younes | .................. | F23L 7/007 |
| 10,107,178 B2 * | 10/2018 | Tour | ........................ | F01P 3/02 |
| 10,378,431 B2 * | 8/2019 | Tour | ....................... | F01L 5/045 |
| 2003/0188531 A1 * | 10/2003 | Wright | ................. | F02D 41/145 |
| | | | | 60/602 |
| 2004/0055585 A1 * | 3/2004 | Smolarek | ................ | F02B 51/02 |
| | | | | 123/26 |
| 2004/0123849 A1 * | 7/2004 | Bryant | .................... | F02B 33/26 |
| | | | | 123/563 |
| 2004/0177837 A1 * | 9/2004 | Bryant | .................... | F02B 75/22 |
| | | | | 123/559.1 |
| 2005/0132713 A1 * | 6/2005 | Neary | ....................... | F02C 6/04 |
| | | | | 60/784 |
| 2005/0172631 A1 * | 8/2005 | Primlani | .................. | F23R 7/00 |
| | | | | 60/698 |
| 2009/0056670 A1 * | 3/2009 | Zhao | ........................ | F02B 41/06 |
| | | | | 123/26 |
| 2009/0223495 A1 * | 9/2009 | Ohata | ..................... | F02M 26/47 |
| | | | | 123/568.21 |
| 2009/0293782 A1 * | 12/2009 | Eriksson | ............... | F22B 35/002 |
| | | | | 60/39.52 |
| 2011/0232544 A1 * | 9/2011 | Eriksson | ................ | F23C 10/20 |
| | | | | 110/263 |
| 2012/0298086 A1 * | 11/2012 | Scuderi | ................... | F02B 33/22 |
| | | | | 123/70 R |
| 2013/0247886 A1 * | 9/2013 | Hamad | ............... | C01B 13/0259 |
| | | | | 123/704 |
| 2013/0333356 A1 * | 12/2013 | Kuroki | .................... | F02B 47/10 |
| | | | | 60/278 |
| 2014/0261341 A1 * | 9/2014 | Ashmann | ................ | F02B 71/06 |
| | | | | 123/568.11 |
| 2016/0040592 A1 * | 2/2016 | Zajac | .................... | F02D 19/022 |
| | | | | 123/527 |
| 2017/0022939 A1 * | 1/2017 | Nogi | ..................... | F01N 3/0871 |
| 2017/0241337 A1 * | 8/2017 | Mokheimer | ............ | F02C 7/224 |
| 2017/0335805 A1 * | 11/2017 | Zhang | .................... | F01N 5/025 |
| 2018/0313280 A1 * | 11/2018 | Kim | ...................... | F02D 35/026 |
| 2019/0301382 A1 * | 10/2019 | Asai | ..................... | F02D 41/0052 |
| 2019/0375395 A1 * | 12/2019 | Jentz | .................... | F02M 26/49 |
| 2020/0191386 A1 * | 6/2020 | Harper, Jr. | ............. | F25J 3/0266 |
| 2021/0108564 A1 * | 4/2021 | Mokheimer | ............. | F02C 1/05 |

FOREIGN PATENT DOCUMENTS

| | | |
|---|---|---|
| ES | 2751129 A1 | 3/2020 |
| GB | 2342390 A | 4/2000 |

* cited by examiner

OXYCOMBUSTION ENGINE SYSTEMS INCLUDING RECIRCULATION MANAGEMENT FEATURES

BACKGROUND

Field

The present disclosure relates to oxycombustion engine systems and methods for operating the same. More particularly, the present disclosure relates to oxycombution engine systems including features for managing the recirculation of exhaust gas, and features for separating nitrogen from air to form a nitrogen-depleted gas for use in an oxycombustion process.

Technical Background

Petroleum-based fuels are used to power the vast majority of vehicles. For example, fuels such as gasoline, diesel fuel, and natural gas are relatively inexpensive and widely available to users, and are used to power internal combustion engines of vehicles throughout the world. However, the combustion of petroleum-based fuels may release pollutants into the environment, which may be undesirable for a number of reasons. As alternative sources of energy may be too costly and underdeveloped, internal combustion engines are needed that can operate with reduced emission of pollutants.

BRIEF SUMMARY

One strategy for reducing the emission of pollutants includes the utilization of a nitrogen-depleted gas during the combustion process, referred to herein as "oxycombustion." The nitrogen-depleted gas includes oxygen and little or no nitrogen, such that the combustion process primarily produces carbon dioxide and water vapor, while producing minimal or no nitrogen oxides (e.g., NO and $NO_2$, referred to herein as $NO_x$). The production of $NO_x$ is regulated by various jurisdictions, and accordingly, reducing or eliminating the production of $NO_x$ can assist maintaining compliance with emissions regulations.

Further, in some internal combustion engine systems, carbon dioxide is separated from the exhaust gas and stored for subsequent disposal, thereby reducing or eliminating the emission of carbon dioxide to the atmosphere. However, in conventional combustion processes, separating carbon dioxide from nitrogen and/or $NO_x$ in the exhaust gas is difficult and cumbersome. By contrast, because the exhaust gases of oxycombustion engine systems include little or no nitrogen and/or $NO_x$, separating carbon dioxide from the exhaust gas for subsequent storage and disposal is simplified.

However, conventional methods and apparatuses for producing nitrogen-depleted gases are cumbersome and difficult to integrate on-board with internal combustion engines in vehicle applications. Further, nitrogen-depleted gases for use in oxycombustion processes generally include greater concentrations of oxygen than air. Because of the increased oxygen concentration, oxycombustion processes generate comparatively more heat than conventional combustion processes that utilize air, and the additional heat can cause components of the engine to overheat, damaging the engine components and/or reducing the usable life of the engine components.

Accordingly, a need exists for improved oxycombustion engine systems. Embodiments of the present disclosure are directed to oxycombustion engine systems that include features for managing the recirculation of exhaust gas to a combustion chamber. By managing the recirculation of exhaust gas to the combustion chamber, desirable combustion stability can be maintained and undesirable emissions can be effectively managed. Further, by managing the recirculation of exhaust gas to the combustion chamber, a temperature within the combustion chamber can be maintained within an acceptable range. Some embodiments described herein further include features for separating nitrogen from air that can be incorporated on-board in vehicle applications.

In one embodiment, a method for operating an oxycombustion engine system includes passing a nitrogen-depleted gas, a fuel, and a recycled exhaust gas into a combustion chamber, combusting a mixture of the nitrogen-depleted gas, the fuel, and the recycled exhaust gas, thereby producing an exhaust gas including carbon dioxide, detecting a pressure of the recycled exhaust gas passed to the combustion chamber, determining whether the detected pressure of the recycled exhaust gas is less than a configurable pressure threshold, and in response to determining that the detected pressure of the recycled exhaust gas is less than the configurable pressure threshold, increasing the pressure of the recycled exhaust gas passed to the combustion chamber.

In another embodiment, a method for operating an oxycombustion engine system includes passing a nitrogen-depleted gas, a fuel, and a recycled exhaust gas into a combustion chamber, combusting a mixture of the nitrogen-depleted gas, the fuel, and the recycled exhaust gas, thereby producing an exhaust gas including carbon dioxide, detecting a temperature associated with the combustion chamber, determining whether the detected temperature is above a configurable temperature threshold, and in response to determining that the detected temperature is greater than the configurable temperature threshold, increasing the pressure of the recycled exhaust gas passed to the combustion chamber.

In yet another embodiment, an oxycombustion engine system includes a combustion chamber, a mixing chamber in selective communication with the combustion chamber, a filtration chamber in communication with the mixing chamber, the filtration chamber including a filtration medium structurally configured to separate nitrogen from air, a recycled exhaust pressure sensor, where the recycled exhaust pressure sensor is structurally configured to detect a pressure of a recycled exhaust gas passed to the mixing chamber, at least one of a valve and a blower, and a controller communicatively coupled to the recycled exhaust pressure sensor and the at least one of the valve and the blower, the controller including a processor and a computer readable and executable instruction set, which when executed, causes the processor to receive a signal from the recycled exhaust pressure sensor indicative of a pressure of the recycled exhaust gas passed to the combustion chamber, determine whether the detected pressure of the recycled exhaust gas is less than a configurable pressure threshold, and in response to determining that the detected pressure of the recycled exhaust gas is less than the configurable pressure threshold, direct the at least one of the valve and the blower to increase a pressure of the recycled exhaust gas passed to the combustion chamber.

In yet another embodiment, an oxycombustion engine system includes a combustion chamber, a mixing chamber in selective communication with the combustion chamber, a filtration chamber in communication with the mixing chamber, the filtration chamber including a filtration medium structurally configured to separate nitrogen from air, a temperature sensor structurally configured to detect a temperature associated with the combustion chamber, at least one of a valve and a blower, and a controller communicatively coupled to the temperature sensor and the at least one of the valve and the blower, the controller including a processor and a computer readable and executable instruction set, which when executed, causes the processor to receive a signal from the temperature sensor indicative of a temperature associated with the combustion chamber, determine whether the detected temperature is greater than a configurable temperature threshold, and in response to determining that the detected temperature is greater than the configurable temperature threshold, direct the at least one of the valve and the blower to increase a pressure of recycled exhaust gas passed to the combustion chamber.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to oxycombustion engine systems that include features for managing the recirculation of exhaust gas to a combustion chamber. By managing the recirculation of exhaust gas to the combustion chamber, desirable combustion stability can be maintained and undesirable emissions can be effectively managed. Further, by managing the recirculation of exhaust gas to the combustion chamber, a temperature within the combustion chamber can be maintained within an acceptable range. Some embodiments described herein further include features for separating nitrogen from air that can be incorporated on-board in vehicle applications.

Figure 1A:
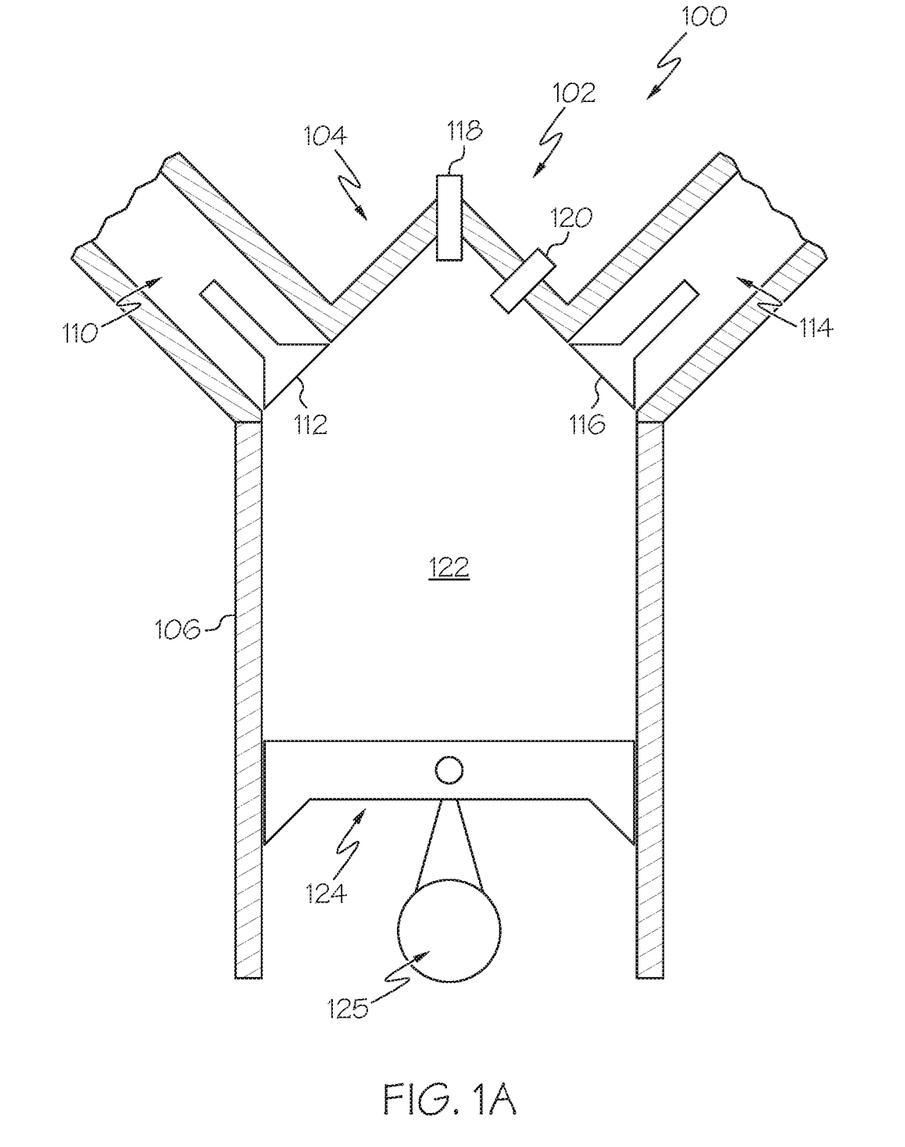
FIG. 1A schematically depicts a section view of a combustion chamber of an internal combustion engine of an oxycombustion engine system, according to one or more embodiments shown and described herein.

Now referring to FIG. 1A, a section view of an internal combustion engine 102 of an oxycombustion engine system 100 is schematically depicted. In the embodiment depicted in FIG. 1A, the internal combustion engine 102 includes a cylinder head 104 engaged with a block that defines one or more sidewalls 106 engaged with the cylinder head 104. In embodiments, a piston 124 is engaged with the one or more sidewalls 106. The piston 124, the cylinder head 104, and the one or more sidewalls 106 at least partially define a combustion chamber 122 in which fuel is combusted. In embodiments, the piston 124 is movable along the one or more sidewalls 106 toward and away from the cylinder head 104, for example, as fuel is combusted within the combustion chamber 122.

In embodiments, the piston 124 is coupled to a crankshaft 125. For example in the embodiment depicted in FIG. 1A, the piston 124 is coupled to the crankshaft 125 through a connecting rod, and in operation, linear movement of the piston 124 along the one or more sidewalls 106 is converted into rotational movement of the crankshaft 125. In embodiments in which the internal combustion engine 102 is the engine of a vehicle, rotational movement of the crankshaft 125 may drive a wheel or wheels of the vehicle to provide the vehicle with mobility. In some embodiments, such as embodiments in which the internal combustion engine 102 is part of a power generation system, the crankshaft 125 may drive a generator that produces electrical current.

In embodiments, the internal combustion engine 102 includes an intake valve 112 and an exhaust valve 116. The intake valve 112 and the exhaust valve 116 are each positionable between an open position and a closed position, and can each be moved between the open position and the closed position by any suitable device, such as and without limitation, a cam shaft, a hydraulic actuator, an electromagnetic actuator, a pneumatic actuator, or the like. Through movement of the intake valve 112, the combustion chamber 122 is in selective communication with an engine intake 110. In embodiments, the engine intake 110 may be an intake manifold or the like, through which intake gas, such as a nitrogen-depleted gas, is passed into the combustion chamber 122.

Through selective movement of the exhaust valve 116, the combustion chamber 122 is in selective communication with an engine exhaust 114. In some embodiments, the engine exhaust 114 may be an exhaust manifold or the like through which exhaust gases (e.g., combustion by-products from the combustion chamber 122) are passed after fuel is combusted within the combustion chamber 122. While in the section view depicted in FIG. 1A, a single intake valve 112 and a single exhaust valve 116 are shown, it should be understood that this is merely an example, and embodiments described herein may include any suitable number of intake valves and exhaust valves in communication with the combustion chamber 122.

In embodiments, the internal combustion engine 102 includes a fuel injector 118 and an ignition device 120 in communication with the combustion chamber 122. The fuel injector 118 generally passes fuel, such as gasoline, diesel fuel, natural gas, or the like, into the combustion chamber 122. In embodiments, the fuel injector 118 may include any suitable device for passing fuel into the combustion chamber 122, for example and without limitation, a multi-hole injector, a hollow cone injector, a solid cone injector, a piezo or solenoid-driven fuel injector, or the like. While in the embodiment depicted in FIG. 1A, the internal combustion engine 102 includes the fuel injector 118 in direct communication with the combustion chamber 122, it should be understood that this is merely an example, and fuel can be indirectly passed into the combustion chamber 122, for example through the engine intake 110.

The ignition device 120 may include a spark plug or the like that is operable to ignite or assist igniting fuel within the combustion chamber 122. While in the embodiment depicted in FIG. 1A the internal combustion engine 102 includes the ignition device 120, it should be understood that this is merely an example. For example, the internal combustion engine 102 may be a spark-ignition engine, and the ignition device 120 may ignite fuel within the combustion chamber 122. However, in some embodiments, the internal combustion engine 102 may be a compression-ignition engine and fuel within the combustion chamber 122 may be partially or fully ignited as a result of compression of the combustion chamber 122 via movement of the piston 124 toward the cylinder head 104. In embodiments in which the internal combustion engine 102 is a compression-ignition engine, the internal combustion engine 102 may or may not include the ignition device 120.

Figure 1B:
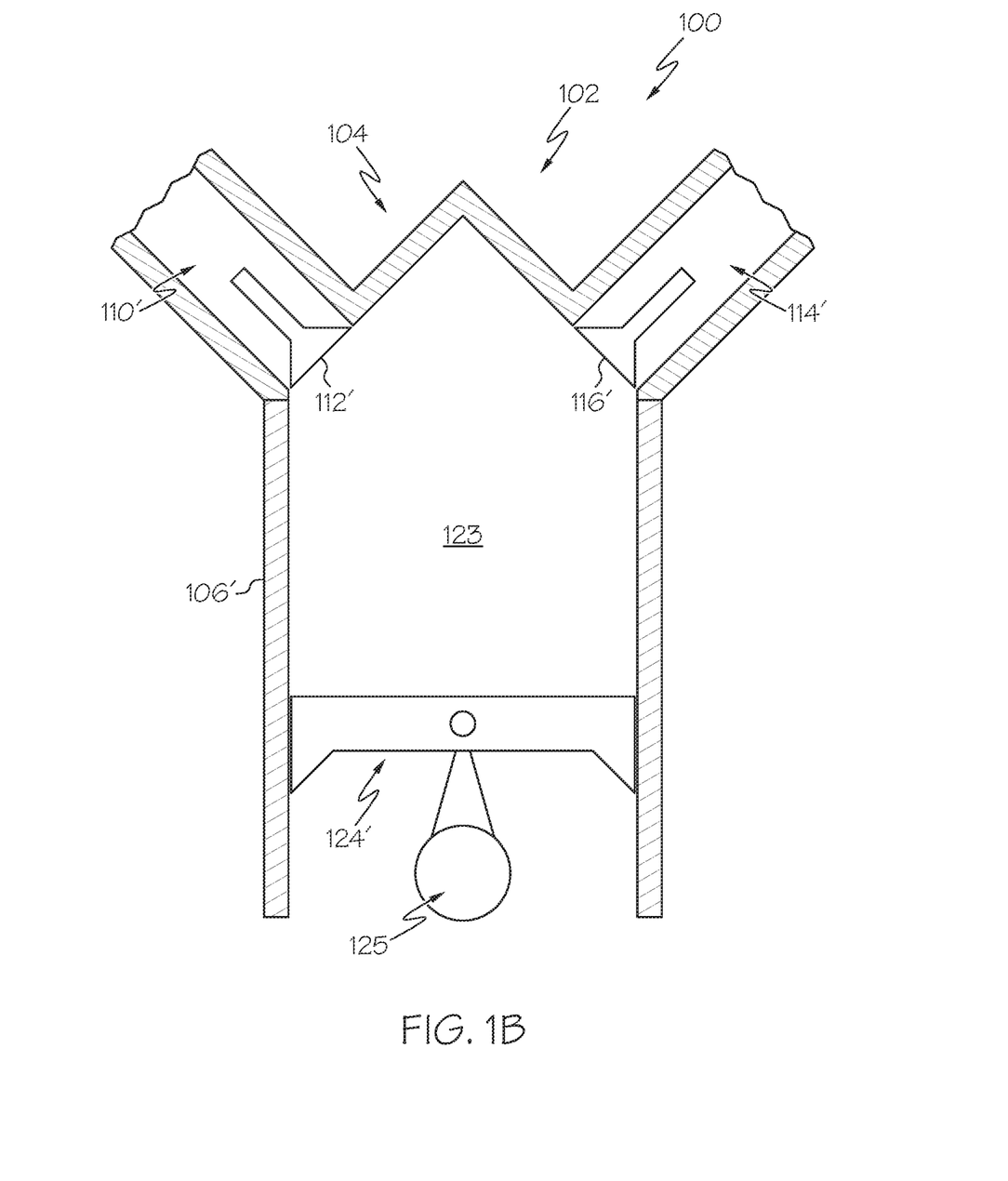
FIG. 1B schematically depicts a section view of a compression chamber of the internal combustion engine of FIG. 1A, according to one or more embodiments shown and described herein.

Referring to FIG. 1B, another section view of the internal combustion engine 102 is depicted. As shown in FIG. 1B, the internal combustion engine 102 further includes a compression chamber 123 that is defined at least in part by the cylinder head 104, one or more sidewalls 106' and a compressor piston 124'. The internal combustion engine 102 may include an intake valve 112' and an outlet valve 116' that are in communication with the compression chamber 123. The intake valve 112' and the outlet valve 116' are each repositionable between an open position and a closed position, and can be moved between the open position and the closed position by any suitable device, such as and without limitation, a cam shaft, a hydraulic actuator, an electromagnetic actuator, a pneumatic actuator, or the like. Through selective movement of the intake valve 112', the compression chamber 123 is in selective communication with an intake 110'. In embodiments, the intake 110' may be an intake manifold or the like through which air is passed to the compression chamber 123.

Through selective movement of the outlet valve 116', the compression chamber 123 is in selective communication with an outlet 114'. In some embodiments, the outlet 114' may be a manifold or the like through which compressed gas from the compression chamber 123 is passed. While in the view depicted in FIG. 1B, a single intake valve 112' and a single outlet valve 116' are shown in communication with the compression chamber 123, it should be understood that this is merely an example, and embodiments described herein may include any suitable number of intake valves and outlet valves in communication with the compression chamber 123.

In embodiments, the compressor piston 124' is movable toward and away from the cylinder head 104 along the one or more sidewalls 106'. For example in some embodiments, the compressor piston 124' is coupled to the crankshaft 125 through a connecting rod. As the crankshaft 125 rotates, for example as the result of the combustion of fuel within the combustion chamber 122 (FIG. 1A), the crankshaft 125 causes the compressor piston 124' to move along the one or more sidewalls 106' toward the cylinder head 104 and away from the cylinder head 104, thereby compressing and expanding the compression chamber 123.

In operation, the intake valve 112' may selectively open such that the compression chamber 123 is in communication with the intake 110'. With the intake valve 112' in the open position, air can be drawn from the intake 110' into the compression chamber 123 as the compressor piston 124' moves away from the cylinder head 104.

Once the compressor piston 124' is at or near the bottom of its stroke (e.g., a bottom dead center position), the intake valve 112' can be moved into the closed position. As the crankshaft 125 continues to rotate, the compressor piston 124' then moves toward the cylinder head 104, thereby compressing the air within the compression chamber 123. Compressed air within the compression chamber 123 may then be released from the compression chamber 123 by moving the outlet valve 116' to the open position, thereby allowing the compressed air to move from the compression chamber 123 to the outlet 114'. In this way, air can be compressed within the compression chamber 123 through movement of the compressor piston 124' as the crankshaft 125 rotates.

Referring to FIGS. 1A and 1B, in some embodiments, the compression chamber 123 and the combustion chamber 122 may be defined within a common engine block, and the piston 124 and the compressor piston 124' may be directly or indirectly connected to the same crankshaft 125. While in FIGS. 1A and 1B a single combustion chamber 122 and a single compression chamber 123 of the internal combustion engine 102 are shown, it should be understood that the internal combustion engine 102 may include multiple combustion chambers and/or multiple compression chambers. Further, while the compression chamber 123 of FIG. 1B does not include an ignition device or a fuel injector, it should be understood that this is merely an example. For example, in some embodiments, the compression chamber 123 may be identical to the combustion chamber 122 shown in FIG. 1A, and may include an ignition device and/or a fuel injector. In these embodiments, air can be drawn into the compression chamber 123 and can be compressed by the compressor piston 124', as described above with reference to FIG. 1B. In some operation modes, fuel can also be passed into the compression chamber 123 and can be combusted, similar to the process outlined in reference to the combustion chamber 122 of FIG. 1A, thereby allowing the compression chamber 123 to also be used as a combustion chamber. In this way, the compression chamber 123 may be utilized to compress air in some operating modes, and as a combustion chamber to provide additional power output in some operating modes.

While the embodiment depicted in FIGS. 1A and 1B depict a combustion chamber 122 and a compression chamber 123 that are defined at least in part by pistons 124, 124' engaged with the one or more sidewalls 106, 106', it should be understood that this is merely an example. For example internal combustion engines described herein may include combustion chambers and/or compression chambers that are defined by a rotor positioned within a housing (e.g., a rotary engine).

Figure 2:
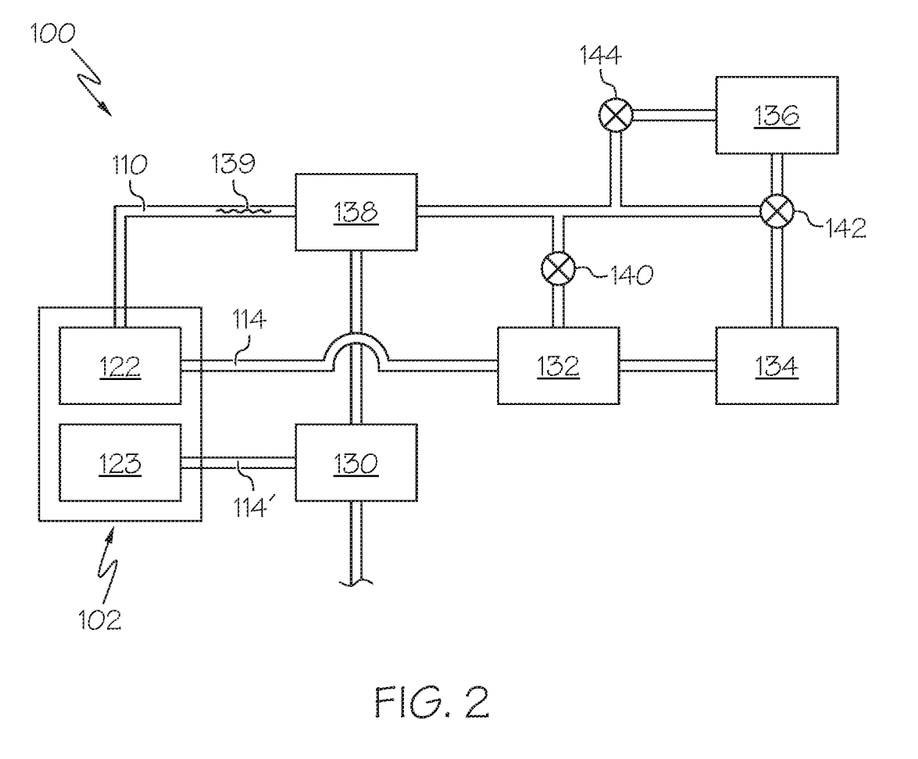
FIG. 2 schematically depicts a filtration chamber, a compressor, a condenser, a carbon dioxide storage unit, and a mixing chamber of the oxycombustion engine system of FIG. 1A, according to one or more embodiments shown and described herein.

Referring to FIG. 2, a schematic diagram of the oxycombustion engine system 100 is depicted. In embodiments, the oxycombustion engine system 100 includes a filtration chamber 130 and a mixing chamber 138. In embodiments, the filtration chamber 130 is in communication with the compression chamber 123, and the combustion chamber 122 is in communication with the mixing chamber 138. In the embodiment depicted in FIG. 2, the oxycombustion engine system 100 further includes a compressor 132, a condenser 134, and a carbon dioxide storage unit 136.

The filtration chamber 130 is in selective communication with the compression chamber 123, for example through the outlet 114', and receives compressed air from the compression chamber 123. In embodiments, the filtration chamber 130 includes a filtration medium that is structurally configured to separate nitrogen from compressed air to form a nitrogen-depleted gas. The filtration chamber 130 may separate nitrogen from compressed air through any suitable process or combination of processes, for example and without limitation, pressure-swing adsorption, temperature-swing adsorption, or the like. In some embodiments, the filtration medium of the filtration chamber 130 may include for example and without limitation, zeolites, activated carbon, molecular sieves, or the like. In some embodiments, the filtration chamber 130 and the compression chamber 130 are structurally configured to provide nitrogen-depleted gas at a pressure that is greater than or equal to ambient pressure. By providing nitrogen-depleted gas at a pressure that is greater than or equal to ambient pressure, other compression devices, such as a turbocharger and supercharger may be omitted.

The compressor 132 is in selective communication with the combustion chamber 122, for example through the engine exhaust 114, and receives exhaust gas from the combustion chamber 122 of the internal combustion engine 102. The compressor 132 may include any device suitable for compressing exhaust gas, and may include, for example and without limitation, a reciprocating compressor, a rotary screw compressor, a centrifugal compressor, or the like.

The condenser 134 is in communication with the compressor 132 and is structurally configured to condense water vapor from compressed exhaust gas passed to the condenser 134 from the compressor 132. In embodiments, the condenser 134 may include any suitable construction to condense water vapor from compressed exhaust gas, and may include for example and without limitation, an air-cooled condenser, a water-cooled condenser, an evaporative condenser, or the like.

The carbon dioxide storage unit 136 is in selective communication with the condenser 134 and is structurally configured to store carbon dioxide. For example, the carbon dioxide storage unit 136 may include a storage tank or the like that stores carbon dioxide in exhaust gas passed to the carbon dioxide storage unit 136 from the condenser 134. As noted above, in oxycombustion processes, exhaust gas from the combustion chamber 122 may primarily include carbon dioxide and water vapor. Accordingly, as water vapor is separated from the exhaust gas by the condenser 134, the exhaust gas passed to the carbon dioxide storage unit 136 from the condenser 134 may primarily contain carbon dioxide.

In embodiments in which the oxycombustion engine system 100 is in a vehicle, carbon dioxide can be stored on-board in the carbon dioxide storage unit 136 and may be periodically discharged, for example at a service station. In this way, the oxycombustion engine system 100 may emit little or no carbon dioxide to the atmosphere.

In embodiments, the oxycombustion engine system 100 includes the mixing chamber 138 in communication with the filtration chamber 130 and the combustion chamber 122. The mixing chamber 138 is also in selective communication with the compressor 132, the condenser 134, and/or the carbon dioxide storage unit 136. In embodiments, the mixing chamber 138 is structurally configured to mix recycled exhaust gas from the compressor 132, the condenser 134, and/or the carbon dioxide storage unit 136, with nitrogen-depleted gas from the filtration chamber 130. The mixture of nitrogen depleted gas and recycled exhaust gas from the mixing chamber 138 is then directed to the combustion chamber 122. The mixing chamber 138 may include any suitable geometry for mixing exhaust gas from any of the compressor 132, the condenser 134, and/or the carbon dioxide storage unit 136 with nitrogen-depleted gas from the filtration chamber 130.

In some embodiments, the oxycombustion engine system 100 may additionally include a mixer 139 that can further mix recycled exhaust gas from the compressor 132, the condenser 134, and/or the carbon dioxide storage unit 136 with the nitrogen-depleted gas from the filtration chamber 130. For example, in the embodiment depicted in FIG. 2, the oxycombustion engine system 100 includes the mixer 139 positioned between the mixing chamber 138 and the combustion chamber 122 to mix the recycled exhaust gas and the nitrogen-depleted gas passed to the combustion chamber 122 from the mixing chamber 138. In embodiments, the mixer 139 may include any suitable structure for mixing gases, such as a baffle or baffles, a static mixer, or the like.

In some embodiments, the oxycombustion engine system 100 includes a compressor valve 140, a condenser valve 142, and/or a carbon dioxide storage unit valve 144. Through selective movement of the compressor valve 140, the condenser valve 142, and the carbon dioxide storage unit valve 144, exhaust gases from the compressor 132, the condenser 134, and/or the carbon dioxide storage unit 136 can be selectively directed to the mixing chamber 138.

In embodiments, the compressor valve 140 is positionable between an open position and a closed position. In the open position, the mixing chamber 138 and the compressor 132 are in communication with one another through the compressor valve 140. Through the mixing chamber 138, the compressor 132 is in communication with the combustion chamber 122. In the closed position, the compressor 132 is closed off from the mixing chamber 138 through the compressor valve 140. By moving the compressor valve 140 between the open position and the closed position, compressed exhaust gas from the compressor 132 can be selectively directed to the mixing chamber 138 (and on to the combustion chamber 122). In some embodiments, the compressor valve 140 is a one-way valve, such that exhaust gas from the compressor 132 can be passed to the mixing chamber 138 with the compressor valve 140 in the open position, while gases from the mixing chamber 138 are restricted from flowing back to the compressor 132 through the compressor valve 140.

Similarly, the condenser valve 142 is positionable between an open position and a closed position. In the open position, the condenser 134 and the mixing chamber 138 are in communication with one another through the condenser valve 142. Through the mixing chamber 138, the condenser 134 is in communication with the combustion chamber 122. In the closed position, the condenser 134 is closed off from the mixing chamber 138 through the condenser valve 142. By moving the condenser valve 142 between the open position and the closed position, exhaust gas from the condenser 134 can be selectively directed to the mixing chamber 138 (and on to the combustion chamber 122). In some embodiments, the condenser valve 142 may be a multiport valve, and the condenser 134 may be in communication with the carbon dioxide storage unit 136 through the condenser valve 142. For example, in some embodiments, exhaust gas from the condenser 134 may be passed to the carbon dioxide storage unit 136 through the condenser valve 142, while carbon dioxide stored within the carbon dioxide storage unit 136 is restricted from flowing back to the condenser 134 through the condenser valve 142.

The carbon dioxide storage unit valve 144 is positionable between an open position and a closed position. In the open position, the carbon dioxide storage unit 136 and the mixing chamber 138 are in communication with one another through the carbon dioxide storage unit valve 144. Through the mixing chamber 138, the carbon dioxide storage unit 136 is in communication with the combustion chamber 122. In the closed position, the carbon dioxide storage unit 136 is closed off from the mixing chamber 138 through the carbon dioxide storage unit valve 144. By moving the carbon dioxide storage unit valve 144 between the open position and the closed position, stored carbon dioxide from the carbon dioxide storage unit 136 can be selectively directed to the mixing chamber 138 (and on to the combustion chamber 122). In some embodiments, the carbon dioxide storage unit valve 144 is a one-way valve, such that carbon dioxide from the carbon dioxide storage unit 136 can be passed to the mixing chamber 138 with the carbon dioxide storage unit valve 144 in the open position, while gases from the mixing chamber 138 are restricted from flowing back to the carbon dioxide storage unit 136 through the carbon dioxide storage unit valve 144.

Accordingly, through the compressor valve 140, the condenser valve 142, and the carbon dioxide storage unit valve 144, exhaust gas can be directed to the mixing chamber 138 from any or all of the compressor 132, the condenser 134, and the carbon dioxide storage unit 136. While in the embodiment depicted in FIG. 2, the oxycombustion engine system 100 includes each of the compressor valve 140, the condenser valve 142, and the carbon dioxide storage unit valve 144, it should be understood that this is merely an example. For example in some embodiments, the mixing chamber 138 may be in selective communication with only the compressor 132, the condenser 134, or the carbon dioxide storage unit 136, or any combination thereof. Furthermore, while the compressor valve 140, the condenser valve 142, and the carbon dioxide storage unit valve 144 are described herein as being positionable between an open position and a closed position, it should be understood that the compressor valve 140, the condenser valve 142, and the carbon dioxide storage unit valve 144 may each be partially openable/closable, and can partially obstruct flow of recycled exhaust gas to the mixing chamber 138 through the compressor valve 140, the condenser valve 142, and/or the carbon dioxide storage unit valve 144.

Figure 3:
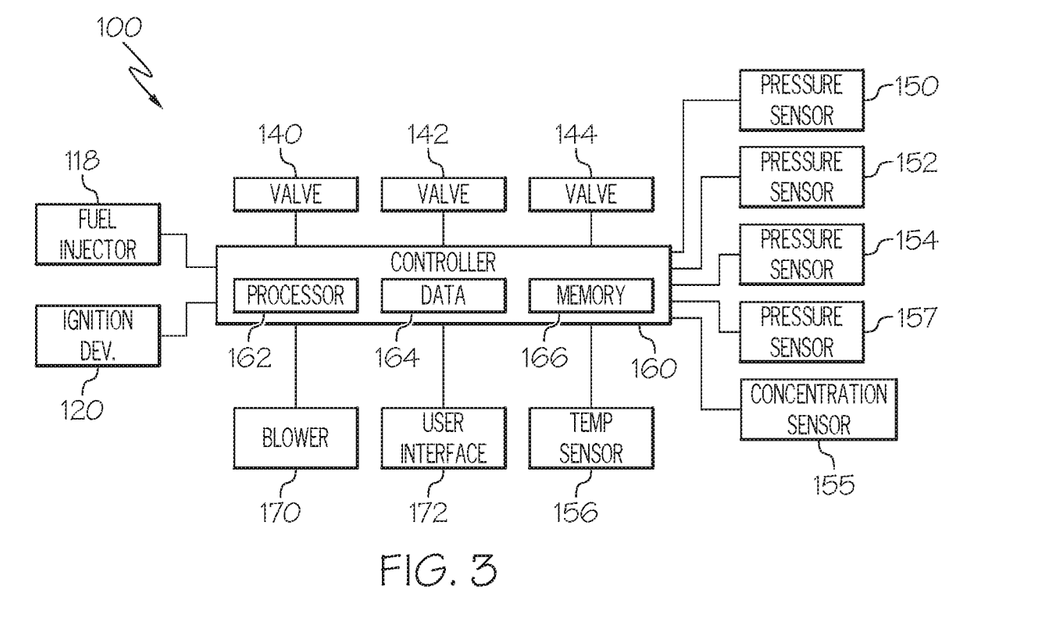
FIG. 3 schematically depicts a control diagram of the oxycombustion engine system of FIG. 1A, according to one or more embodiments shown and described herein.

Referring to FIG. 3, a control diagram of the oxycombustion engine system 100 is schematically depicted. In embodiments, the oxycombustion engine system 100 includes a controller 160. As illustrated, the controller 160 includes a processor 162, a data storage component 164, and/or a memory component 166. The memory component 166 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the controller 160 and/or external to the controller 160.

The memory component 166 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface is also included in the controller 160, and may be implemented as a bus or other communication interface to facilitate communication among the components of the controller 160.

The processor 162 may include any processing component operable to receive and execute instructions (such as from a data storage component 164 and/or the memory component 166). It should be understood that while the components in FIG. 3 are illustrated as residing within the controller 160, this is merely an example, and in some embodiments, one or more of the components may reside external to the controller 160. It should also be understood that, while the controller 160 is illustrated as a single device, this is also merely an example.

In embodiments, the controller 160 is communicatively coupled to one or more components of the oxycombustion engine system 100. For example, in the embodiment depicted in FIG. 3, the controller 160 is communicatively coupled to the compressor valve 140, the condenser valve 142, and the carbon dioxide storage unit valve 144. The processor 162, in embodiments, can direct the compressor valve 140, the condenser valve 142, and/or the carbon dioxide storage unit valve 144 to move between their respective open positions and closed positions, and any positions therebetween. As described above, opening the compressor valve 140, the condenser valve 142, and/or the carbon dioxide storage unit valve 144 selectively direct exhaust gases from the compressor 132 (FIG. 2), the condenser 134 (FIG. 2), and/or the carbon dioxide storage unit 136 (FIG. 2) to the mixing chamber 138 (FIG. 2).

In some embodiments, the controller 160 is communicatively coupled to the fuel injector 118 and/or the ignition device 120. The processor 162 can direct the fuel injector 118 to inject fuel into the combustion chamber 122 (FIG. 1A), and can direct the ignition device 120 to ignite the fuel within the combustion chamber 122 (FIG. 1A).

In some embodiments, the controller 160 is communicatively coupled to one or more sensors. For example and referring to FIGS. 2 and 3, in some embodiments, the oxycombustion engine system 100 further includes a recycled exhaust pressure sensor 150 communicatively coupled to the controller 160. The recycled exhaust pressure sensor 150 is structurally configured to detect a pressure of recycled exhaust gas passed to the mixing chamber 138. For example, the recycled exhaust pressure sensor 150 may be positioned to be in communication with the mixing chamber 138, such that the recycled exhaust pressure sensor 150 can detect the pressure of gas passing to the mixing chamber 138 from the compressor 132, the condenser 134, and/or the carbon dioxide storage unit 136. The recycled exhaust pressure sensor 150 may include any suitable device for detecting a pressure of recycled exhaust gas passed to the mixing chamber 138, for example and without limitation a resistive sensor, a capacitive sensor, a piezoelectric sensor, an optical sensor, a microelectromechanical systems (MEMS) sensor, or the like.

In some embodiments, the oxycombustion engine system 100 further includes nitrogen-depleted gas pressure sensor 152 communicatively coupled to the controller 160. The nitrogen-depleted gas pressure sensor 152 is structurally configured to detect a pressure of nitrogen-depleted gas passed to the mixing chamber 138 from the filtration chamber 130. For example, the nitrogen-depleted gas pressure sensor 152 may be positioned to be in communication with the mixing chamber 138, such that the nitrogen-depleted gas pressure sensor 152 can detect the pressure of nitrogen-depleted gas passing to the mixing chamber 138 from the filtration chamber 130. The nitrogen-depleted gas pressure sensor 152 may include any suitable device for detecting a pressure of nitrogen-depleted gas passed to the mixing chamber 138 from the filtration chamber 130, for example and without limitation a resistive sensor, a capacitive sensor, a piezoelectric sensor, an optical sensor, a MEMS sensor, or the like.

In some embodiments, the oxycombustion engine system 100 further includes a carbon dioxide storage unit pressure sensor 154 communicatively coupled to the controller 160. In embodiments, the carbon dioxide storage unit pressure sensor 154 is structurally configured to detect a pressure of carbon dioxide stored within the carbon dioxide storage unit 136. In embodiments, the carbon dioxide storage unit pressure sensor 154 can assist in managing the storage of carbon dioxide in the carbon dioxide storage unit 136. The carbon dioxide storage unit pressure sensor 154 may include any suitable device for detecting a pressure of carbon dioxide stored in the carbon dioxide storage unit 136, for example and without limitation a resistive sensor, a capacitive sensor, a piezoelectric sensor, an optical sensor, a MEMS sensor, or the like.

In some embodiments, the oxycombustion engine system 100 further includes an ambient pressure sensor 157 communicatively coupled to the controller 160. The ambient pressure sensor 157 is structurally configured to detect an ambient pressure of air surrounding the oxycombustion engine system 100. As referred to herein, "ambient pressure" generally refers to the pressure of air surrounding the oxycombustion engine system 100, which can depend on various factors, such as the elevation of the oxycombustion engine system 100 above (or below) sea level. In embodiments, the ambient pressure sensor 157 may include any suitable device for detecting an ambient pressure surrounding the oxycombustion engine system 100, for example and without limitation a resistive sensor, a capacitive sensor, a piezoelectric sensor, an optical sensor, a MEMS sensor, or the like.

In some embodiments, the oxycombustion engine system 100 further includes a concentration sensor 155 communicatively coupled to the controller 160. The concentration sensor 155 is in communication with the mixing chamber 138, for example, in some embodiments, the concentration sensor 155 is positioned between the mixing chamber 138 and the combustion chamber 122. In embodiments, the concentration sensor 155 is structurally configured to detect a concentration of oxygen in gas (e.g., the mixture of nitrogen-depleted gas and recycled exhaust gas) passing from the mixing chamber 138 to the combustion chamber 122. The concentration sensor 155 may include any suitable sensor for detecting a concentration of oxygen in a gas, and may include for example, a galvanic sensor or the like.

Variations in the oxygen concentration in gas passing from the mixing chamber 138 to the combustion chamber 122 may indicate inadequate mixing of nitrogen-depleted gas from the filtration chamber 130 with recycled exhaust gas from the compressor 132, the condenser 134, and/or the carbon dioxide storage unit 136. In some embodiments, the controller 160 receives a signal from the concentration sensor 155 indicative of a detected oxygen concentration in the mixture of nitrogen-depleted gas and recycled exhaust gas passing from the mixing chamber 138 to the combustion chamber 122. The controller 160, in some embodiments, determines whether a variation of the oxygen concentration exceeds a configurable threshold, and in response to determining that the oxygen concentration variation exceeds the configurable threshold, sends a signal to a user interface 172 to provide an indication to a user, for example that the oxycombustion engine system 100 should be taken to a service station for repair. As noted above, variations in the oxygen concentration may indicate inadequate mixing of the nitrogen-depleted gas and recycled exhaust gas, and inadequate mixing may degrade combustion quality and/or stability.

In some embodiments, the configurable threshold is a variation in oxygen concentration greater than 0.5%. In some embodiments, the configurable threshold is a variation in oxygen concentration greater than 1%. In some embodiments, the configurable threshold is a variation in oxygen concentration greater than 5%. In some embodiments, the configurable threshold is a variation in oxygen concentration greater than 10%. In some embodiments, the configurable threshold is a variation in oxygen concentration greater than 15%.

In some embodiments, the oxycombustion engine system 100 includes the user interface 172 communicatively coupled to the controller 160. The user interface 172, in embodiments, may include a visual display such as a graphical user interface (GUI), an audible alarm, or a combination thereof that can provide an indication to a user. In some embodiments, the user interface 172 may be structurally configured to receive input from a user and may include, for example and without limitation, a touchscreen, an alphanumeric keypad, or the like. The user interface 172 may provide users with information regarding the operation of the oxycombustion engine system 100.

For example, in some embodiments, the carbon dioxide storage unit pressure sensor 154 may send a signal to the controller 160 indicative of a detected pressure of carbon dioxide stored in the carbon dioxide storage unit 136. The controller 160 may then determine whether the detected pressure of the carbon dioxide in the carbon dioxide storage unit 136 exceeds a configurable threshold. In response to determining that the detected pressure of the carbon dioxide in the carbon dioxide storage unit 136 exceeds the configurable threshold, the controller 160 sends a signal to the user interface 172 to provide an indication to a user, for example a driver, that the carbon dioxide storage unit 136 should be unloaded, for example at a service station. In embodiments, the configurable threshold may be associated with a capacity of the carbon dioxide storage unit 136. Accordingly the controller 160, the user interface 172, and the carbon dioxide storage unit pressure sensor 154 can assist in ensuring that a user unloads the carbon dioxide storage unit 136 periodically, so that the carbon dioxide storage unit 136 can maintain capacity to store carbon dioxide produced during the oxycombustion process.

In some embodiments, the controller 160 may also manage the amount of carbon dioxide unloaded from the carbon dioxide storage unit 136. For example, in some embodiments, some carbon dioxide may be retained in the carbon dioxide storage unit 136 during the unloading process. By retaining some carbon dioxide in the carbon dioxide storage unit 136, the retained carbon dioxide within the carbon dioxide storage unit 136 can be provided to the mixing chamber 138. In some embodiments, the controller 160 may manage the unloading of carbon dioxide from the carbon dioxide storage unit 136 based at least in part on a detected ambient pressure from the ambient pressure sensor 157. For example, in some embodiments, during the unloading process, the controller 160 receives a signal from the ambient pressure sensor 157 indicative of a detected ambient pressure. The controller 160 may restrict the carbon dioxide storage unit 136 from unloading carbon dioxide beyond a configurable threshold that is based at least in part on the detected ambient pressure from the ambient pressure sensor

157. For example, in some embodiments, the configurable threshold is greater than or equal to the detected ambient pressure from the ambient pressure sensor 157. In this way, the controller 160 and the ambient pressure sensor 157 may assist in ensuring that carbon dioxide within the carbon dioxide storage unit 136 is not unloaded below ambient pressure, such that the carbon dioxide storage unit 136 can provide carbon dioxide to the mixing chamber 138 even after unloading.

In some embodiments, the controller 160 may restrict the carbon dioxide storage unit 136 from unloading carbon dioxide beyond a configurable threshold that is based at least in part on a detected pressure of nitrogen-depleted gas passed to the mixing chamber 138 from the filtration chamber 130. For example, in some embodiments, the controller 160 receives a signal from the nitrogen-depleted gas pressure sensor 152 indicative of a detected pressure of nitrogen-depleted gas passed to the mixing chamber 138 from the filtration chamber 130. The controller 160 may then determine the configurable threshold based at least in part on the detected pressure from the nitrogen-depleted gas pressure sensor 152. In some embodiments, controller 160 may determine the configurable threshold based on an average pressure of nitrogen-depleted gas passed to the mixing chamber 138 from the filtration chamber 130 over the course of operation of the oxycombustion engine system 100. In some embodiments, the controller 160 may determine the configurable threshold based on a maximum pressure of nitrogen-depleted gas passed to the mixing chamber 138 from the filtration chamber 130 over the course of operation of the oxycombustion engine system 100. The controller 160 may then restrict the carbon dioxide storage unit 136 from unloading carbon dioxide beyond the configurable threshold based at least in part on the determined average pressure or the determined maximum pressure. As one example, the controller 160 may determine the configurable threshold to be greater than or equal to the determined average pressure of nitrogen-depleted gas passed to the mixing chamber 138 from the filtration chamber 130. In some embodiments, the configurable threshold is at least 50 kilopascals greater than the determined average pressure of the determined average pressure of nitrogen-depleted gas passed to the mixing chamber 138 from the filtration chamber 130. In some embodiments, the configurable threshold is at least 100 kilopascals greater than the determined average pressure of the determined average pressure of nitrogen-depleted gas passed to the mixing chamber 138 from the filtration chamber 130.

As another example, the controller 160 may determine the configurable threshold to be greater than or equal to the determined maximum pressure of nitrogen-depleted gas passed to the mixing chamber 138 from the filtration chamber 130. In some embodiments, the configurable threshold is greater than or equal to the determined maximum pressure of nitrogen-depleted gas passed to the mixing chamber 138 from the filtration chamber 130. In some embodiments, the configurable threshold is at least 50 kilopascals greater than the determined maximum pressure of the nitrogen-depleted gas passed to the mixing chamber 138 from the filtration chamber 130. In some embodiments, the configurable threshold is at least 100 kilopascals greater than the determined maximum pressure of nitrogen-depleted gas passed to the mixing chamber 138 from the filtration chamber 130. By retaining carbon dioxide within the carbon dioxide storage unit 136 at a pressure that is greater than or equal to an average or maximum pressure of nitrogen-depleted gas passed to the mixing chamber 138 from the filtration chamber 130, the carbon dioxide storage unit 136 can provide carbon dioxide to the mixing chamber 138 at a pressure greater than the nitrogen-depleted gas passed to the mixing chamber 138, even after unloading.

In some embodiments, the oxycombustion engine system 100 further includes a temperature sensor 156 communicatively coupled to the controller 160. The temperature sensor 156 is structurally configured to directly or indirectly detect a temperature within the combustion chamber 122. For example, in some embodiments, the temperature sensor 156 indirectly detects a temperature of the combustion chamber 122, such as by detecting a temperature of engine coolant passed through coolant passageways of the internal combustion engine 102. The engine coolant may generally absorb thermal energy from the combustion chamber 122 as fuel is combusted, and accordingly, the temperature of the engine coolant may be associated with the temperature of the combustion chamber 122. In some embodiments, the temperature sensor 156 may include a sensor structurally configured to directly detect the temperature of the combustion chamber 122, and may include a sensor such as a thermocouple or the like coupled to the one or more sidewalls 106 (FIG. 1A) and/or the cylinder head 104 (FIG. 1A).

In some embodiments, the controller 160 may send signals to the user interface 172 indicative of a detected temperature from the temperature sensor 156, a detected pressure from the recycled exhaust pressure sensor 150, and/or a detected pressure from the nitrogen-depleted gas pressure sensor 152. In this way, the user interface 172 may provide a user with real-time information related to operation of the oxycombustion engine system 100.

In some embodiments, the oxycombustion engine system 100 further includes a blower 170 communicatively coupled to the controller 160. The blower 170 is structurally configured to increase a pressure of recycled exhaust gas passed from any or all of the compressor 132, the condenser 134, and/or the carbon dioxide storage unit 136 to the mixing chamber 138. For example, the blower 170 can be positioned between the mixing chamber 138 and any one, or all of the compressor 132, the condenser 134, and/or the carbon dioxide storage unit 136. The blower 170 can include any suitable device for increasing the pressure of recycled exhaust gas passing to the mixing chamber 138, for example and without limitation, a pump, a compressor, or the like.

Reference will now be made to methods for operating the oxycombustion engine system 100.

Figure 4:
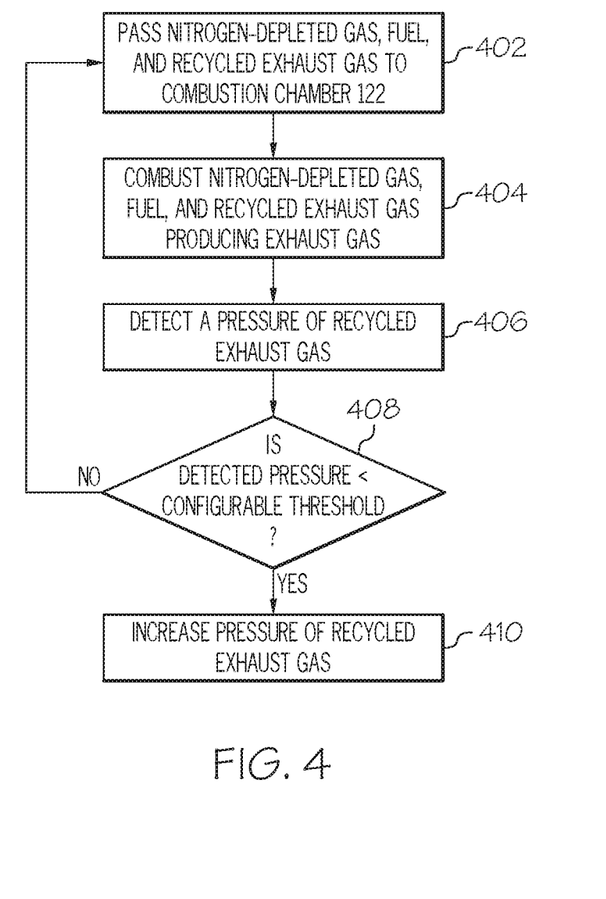
FIG. 4 is a flowchart for an example method for operating the oxycombustion engine system of FIG. 1A, according to one or more embodiments shown and described herein.

Referring to FIGS. 2, 3, and 4, a flowchart for a method for operating the oxycombustion engine system 100 is schematically depicted. In a first block 402, nitrogen-depleted gas, fuel, and recycled exhaust gas are passed into the combustion chamber 122. In embodiments, the fuel can be passed into the combustion chamber 122 via the fuel injector 118. For example, the controller 160 may direct the fuel injector 118 to pass fuel into the combustion chamber 122. As described above, the nitrogen-depleted gas and the recycled exhaust gas can be passed to the combustion chamber 122 via the mixing chamber 138. As further noted above, in some embodiments, the nitrogen-depleted gas and the recycled exhaust gas can be passed to the combustion chamber 122 via the mixing chamber 138 and the mixer 139.

In a second block 404, a mixture of the nitrogen-depleted gas, the fuel, and the recycled exhaust gas are combusted, producing an exhaust gas comprising carbon dioxide. For example, in embodiments in which the internal combustion engine 102 is a spark-ignition engine, the controller 160 may direct the ignition device 120 to ignite the mixture of the nitrogen-depleted gas, the fuel, and the recycled exhaust gas in the combustion chamber 122. In embodiments in which the internal combustion engine 102 is a compression ignition engine, the mixture of the nitrogen-depleted gas, the fuel, and the recycled exhaust gas in the combustion chamber 122 may combust as the result of the piston 124 (FIG. 1A) compressing the combustion chamber 122.

As noted above, combustion of the mixture of the nitrogen-depleted gas, the fuel, and the recycled exhaust gas within the combustion chamber 122 can cause the crankshaft 125 (FIG. 1A) to rotate. Rotation of the crankshaft 125 moves the compressor piston 124' (FIG. 1B) of the compression chamber 123 to compress air within the compression chamber 123, and the compressed air can be provided to the filtration chamber 130. In embodiments, the nitrogen-depleted gas can be formed by filtering the compressed air in the filtration chamber 130.

In a third block 406, a pressure of the recycled exhaust gas passed to the combustion chamber 122 is detected. For example, in some embodiments, the controller 160 receives a signal from the recycled exhaust pressure sensor 150 indicative of a detected pressure of recycled exhaust gas passed to the combustion chamber 122 via the mixing chamber 138.

In a fourth block 408, it is determined whether the detected pressure of the recycled exhaust gas is less than a configurable pressure threshold. For example, in some embodiments, the controller 160 determines whether the detected pressure of the recycled exhaust gas from the recycled exhaust pressure sensor 150 is less than a configurable pressure threshold.

The configurable pressure threshold, in embodiments, can be a variable value that depends on engine operating conditions. As one example, the configurable pressure threshold may be based at least in part on a detected pressure of nitrogen-depleted gas passed to the combustion chamber 122 via the mixing chamber 138. For example, in some embodiments, the controller 160 receives a signal from the nitrogen-depleted gas pressure sensor 152 indicative of a pressure of nitrogen-depleted gas passed from the filtration chamber 130 to the combustion chamber 122, via the mixing chamber 138. In some embodiments, the configurable pressure threshold is the detected pressure of nitrogen-depleted gas passed to the combustion chamber 122. In some embodiments, the configurable pressure threshold is greater than the detected pressure of the nitrogen-depleted gas passed to the combustion chamber 122. For example, in some embodiments, the configurable pressure threshold may be a fixed value above the detected pressure of the nitrogen-depleted gas passed to the combustion chamber 122.

In a fifth block 410, in response to determining that the detected pressure of the recycled exhaust gas is less than the configurable pressure threshold, the pressure of the recycled exhaust gas passed to the combustion chamber 122 is increased. In some embodiments, the controller 160 directs at least one of a valve and a blower (e.g., the blower 170, the carbon dioxide storage unit valve 144, and/or the compressor valve 140) to increase the pressure of recycled exhaust gas passed to the combustion chamber 122. For example in some embodiments, to increase the pressure of the recycled exhaust gas passed to the combustion chamber 122, the controller 160 directs the blower 170 to engage, thereby increasing the pressure of the recycled exhaust gas passed to the combustion chamber 122. In particular, engagement of the blower 170 generally increases the pressure of recycled exhaust gas passed to the mixing chamber 138 from the compressor 132, the condenser 134, and/or from the carbon dioxide storage unit 136 through the blower 170.

In some embodiments, increasing the pressure of recycled exhaust gas includes passing stored carbon dioxide from the carbon dioxide storage unit 136 to the mixing chamber 138. For example, in some embodiments, during ordinary operating conditions, recycled exhaust gas may be provided to the mixing chamber 138 via the condenser 134 (e.g., through the condenser valve 142). In these embodiments, during ordinary operating conditions, exhaust gas from the combustion chamber 122 may be routed to the compressor 132 and may be compressed. From the compressor 132, the exhaust gas may be routed to the condenser 134, and the compressor valve 140 may be in the closed position, thereby restricting the exhaust gas from passing directly from the compressor 132 to the mixing chamber 138 through the compressor valve 140.

As the exhaust gas passes from the compressor 132 to the condenser 134, the condenser 134 then separates water vapor from the exhaust gas, and the exhaust gas is routed from the condenser 134 to the mixing chamber 138, for example, through the condenser valve 142 in the open position. Some of the exhaust gas may also be routed to the carbon dioxide storage unit 136 through the condenser valve 142. As discussed above, in oxycombustion processes, the exhaust gas primarily includes carbon dioxide and water vapor. Accordingly, after separating water vapor from the exhaust gas in the condenser 134, the exhaust gas passed to the mixing chamber 138 and/or the carbon dioxide storage unit 136 may primarily include carbon dioxide.

The pressure of recycled exhaust gas provided to the mixing chamber 138 can be increased by releasing stored exhaust gas from the carbon dioxide storage unit 136 to the mixing chamber 138. For example, the controller 160 may direct the carbon dioxide storage unit valve 144 to move from the closed position to the open position, thereby releasing stored carbon dioxide from the carbon dioxide storage unit 136 to the mixing chamber 138. In embodiments, the controller 160 may direct the carbon dioxide storage unit valve 144 to move from the closed position to the open position, thereby passing the stored carbon dioxide from the carbon dioxide storage unit 136 to the combustion chamber 122 is in response to determining that the detected pressure of the recycled exhaust gas is less than the configurable pressure threshold.

Additionally or alternatively, in some embodiments, the pressure of recycled exhaust gas provided to the mixing chamber 138 can be increased by directing exhaust gas directly from the compressor 132 to the mixing chamber 138. For example, in some embodiments, the controller 160 directs the compressor valve 140 to move from the closed position to the open position, such that exhaust gas from the compressor 132 can pass directly from the compressor 132 to the mixing chamber 138 through the compressor valve 140.

In some embodiments, increasing the pressure of recycled gas passed to the combustion chamber 122 is in response to a detected temperature associated with the combustion chamber 122. For example, in some embodiments, the temperature sensor 156 detects a temperature associated with the combustion chamber 122, and the controller 160 receives a signal from the temperature sensor 156 indicative of a detected temperature associated with the combustion chamber 122. The controller 160 then determines whether the detected temperature received from the temperature sensor 156 is above a configurable temperature threshold. In response to determining that the detected temperature is above the configurable temperature threshold, the controller 160 then increases a pressure of the recycled gas passed to the combustion chamber 122, for example by directing the blower 170 to engage and/or by directing the carbon dioxide storage unit valve 144 to move to the open position, thereby releasing stored carbon dioxide to the mixing chamber 138. In some embodiments, the controller 160 increases the pressure of recycled exhaust gas passed to the combustion chamber 122 by directing the compressor valve 140 to move to the open position, thereby directing compressed exhaust gas from the compressor 132 to the mixing chamber 138.

Accordingly, it should now be understood that embodiments of the present disclosure are directed to oxycombustion engine systems that include features for managing the recirculation of exhaust gas to a combustion chamber. By managing the recirculation of exhaust gas to the combustion chamber, desirable combustion stability can be maintained and undesirable emissions can be effectively managed. Further, by managing the recirculation of exhaust gas to the combustion chamber, a temperature within the combustion chamber can be maintained within an acceptable range. Some embodiments described herein further include features for separating nitrogen from air that can be incorporated on-board in vehicle applications.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An oxycombustion engine system comprising:
   a combustion chamber;
   a mixing chamber in selective communication with the combustion chamber;
   a filtration chamber in communication with the mixing chamber, the filtration chamber comprising a filtration medium structurally configured to separate nitrogen from air;
   a recycled exhaust pressure sensor, wherein the recycled exhaust pressure sensor is structurally configured to detect a pressure of a recycled exhaust gas passed to the mixing chamber;
   at least one of a valve and a blower;
   a controller communicatively coupled to the recycled exhaust pressure sensor and the at least one of the valve and the blower, the controller comprising a processor and a computer readable and executable instruction set, which when executed, causes the processor to:
      receive a signal from the recycled exhaust pressure sensor indicative of a pressure of the recycled exhaust gas passed to the combustion chamber;
      determine whether the detected pressure of the recycled exhaust gas is less than a configurable pressure threshold; and
      in response to determining that the detected pressure of the recycled exhaust gas is less than the configurable pressure threshold, direct the at least one of the valve and the blower to increase a pressure of the recycled exhaust gas passed to the combustion chamber; and
   a concentration sensor communicatively coupled to the controller, wherein the concentration sensor is structurally configured to detect a concentration of oxygen in gas passing to the combustion chamber from the mixing chamber.

2. The oxycombustion engine system of claim 1, further comprising a nitrogen-depleted gas pressure sensor communicatively coupled to the controller, wherein the nitrogen-depleted gas pressure sensor is structurally configured to detect a pressure of nitrogen-depleted-gas passed to the mixing chamber from the filtration chamber.

3. The oxycombustion engine system of claim 2, wherein the computer readable and executable instruction set, when executed, further causes the processor to receive a signal from the nitrogen-depleted gas pressure sensor indicative of a pressure of a nitrogen-depleted gas passed to the mixing chamber, and wherein the configurable pressure threshold is based at least in part on the pressure of the nitrogen-depleted gas passed to the mixing chamber.

4. The oxycombustion engine system of claim 1, further comprising at least one of a baffle and a static mixer positioned between the mixing chamber and the combustion chamber.

5. The oxycombustion engine system of claim 1, further comprising a compressor in selective communication with the combustion chamber.

6. The oxycombustion engine system of claim 1, further comprising a condenser in selective communication with the combustion chamber.

7. The oxycombustion engine system of claim 1, further comprising a carbon dioxide storage unit in selective communication with the combustion chamber.

8. The oxycombustion engine system of claim 1, wherein the at least one of the valve and the blower comprises the blower in communication with the mixing chamber.

9. The oxycombustion engine system of claim 1, further comprising:
a piston that at least partially defines the combustion chamber; and
a crankshaft coupled to the piston.

10. The oxycombustion engine system of claim 9, further comprising a compressor piston coupled to the crankshaft, wherein the compressor piston at least partially defines a compression chamber.

11. The oxycombustion engine system of claim 1, wherein the computer readable and executable instruction set causes the processor to restrict unloading of carbon dioxide from the carbon dioxide storage unit to ensure that carbon dioxide is not unloaded below a configurable threshold.

12. The oxycombustion engine system of claim 11, further comprising an ambient pressure sensor, wherein the computer readable and executable instruction set causes the processor to restrict unloading of carbon dioxide from the carbon dioxide storage unit to ensure that carbon dioxide is not unloaded below ambient pressure.

13. The oxycombustion engine system of claim 11, further comprising a nitrogen-depleted gas pressure sensor operative to detect pressure of nitrogen-depleted gas passed to the mixing chamber from the filtration chamber, wherein the computer readable and executable instruction set causes the processor to restrict unloading of carbon dioxide from the carbon dioxide storage unit based at least in part on the detected pressure of nitrogen-depleted gas passed to the mixing chamber from the filtration chamber.

14. An oxycombustion engine system comprising:
a combustion chamber;
a mixing chamber in selective communication with the combustion chamber;
a filtration chamber in communication with the mixing chamber, the filtration chamber comprising a filtration medium structurally configured to separate nitrogen from air;
a temperature sensor structurally configured to detect a temperature associated with the combustion chamber;
at least one of a valve and a blower; and
a controller communicatively coupled to the temperature sensor and the at least one of the valve and the blower, the controller comprising a processor and a computer readable and executable instruction set, which when executed, causes the processor to:
receive a signal from the temperature sensor indicative of a temperature associated with the combustion chamber;
determine whether the detected temperature is greater than a configurable temperature threshold; and
in response to determining that the detected temperature is greater than the configurable temperature threshold, direct the at least one of the valve and the blower to increase a pressure of recycled exhaust gas passed to the combustion chamber.

15. The oxycombustion engine system of claim 14, further comprising a carbon dioxide storage unit in selective communication with the combustion chamber.

16. The oxycombustion engine system of claim 14, further comprising:
a piston that at least partially defines the combustion chamber; and
a crankshaft coupled to the piston.

17. The oxycombustion engine system of claim 16, further comprising a compressor piston coupled to the crankshaft, wherein the compressor piston at least partially defines a compression chamber.

18. The oxycombustion engine system of claim 14, further comprising a concentration sensor communicatively coupled to the controller, wherein the concentration sensor is structurally configured to detect a concentration of oxygen in gas passing to the combustion chamber from the mixing chamber.

19. An oxycombustion engine system comprising:
a combustion chamber;
a mixing chamber in selective communication with the combustion chamber;
a filtration chamber in communication with the mixing chamber, the filtration chamber comprising a filtration medium structurally configured to separate nitrogen from air;
a recycled exhaust pressure sensor, wherein the recycled exhaust pressure sensor is structurally configured to detect a pressure of a recycled exhaust gas passed to the mixing chamber;
at least one of a valve and a blower;
a controller communicatively coupled to the recycled exhaust pressure sensor and the at least one of the valve and the blower, the controller comprising a processor and a computer readable and executable instruction set, which when executed, causes the processor to:
receive a signal from the recycled exhaust pressure sensor indicative of a pressure of the recycled exhaust gas passed to the combustion chamber;
determine whether the detected pressure of the recycled exhaust gas is less than a configurable pressure threshold; and
in response to determining that the detected pressure of the recycled exhaust gas is less than the configurable pressure threshold, direct the at least one of the valve and the blower to increase a pressure of the recycled exhaust gas passed to the combustion chamber; and
a temperature sensor communicatively coupled to the controller, the computer readable and executable instruction set, when executed, further causes the processor to:
receive a signal from the temperature sensor indicative of a detected temperature associated with the combustion chamber;
determine whether the detected temperature is above a configurable threshold; and
in response to determining that the detected temperature is above the configurable threshold, direct the at least one of the valve and the blower to increase a pressure of the recycled exhaust gas passed to the combustion chamber.

20. An oxycombustion engine system comprising:
a combustion chamber;
a mixing chamber in selective communication with the combustion chamber;
a filtration chamber in communication with the mixing chamber, the filtration chamber comprising a filtration medium structurally configured to separate nitrogen from air;

a recycled exhaust pressure sensor, wherein the recycled exhaust pressure sensor is structurally configured to detect a pressure of a recycled exhaust gas passed to the mixing chamber;

at least one of a valve and a blower;

a controller communicatively coupled to the recycled exhaust pressure sensor and the at least one of the valve and the blower, the controller comprising a processor and a computer readable and executable instruction set, which when executed, causes the processor to:

receive a signal from the recycled exhaust pressure sensor indicative of a pressure of the recycled exhaust gas passed to the combustion chamber;

determine whether the detected pressure of the recycled exhaust gas is less than a configurable pressure threshold; and in response to determining that the detected pressure of the recycled exhaust gas is less than the configurable pressure threshold, direct the at least one of the valve and the blower to increase a pressure of the recycled exhaust gas passed to the combustion chamber; and a carbon dioxide storage unit pressure sensor for detecting a pressure of carbon dioxide stored in a carbon dioxide storage unit, wherein the computer readable and executable instruction set causes the processor to:

determine whether the detected pressure of the carbon dioxide in the carbon dioxide storage unit exceeds a configurable threshold; and in response to determining that the detected pressure of the carbon dioxide exceeds the configurable threshold, send a signal to a user interface to provide an indication to a user.

\* \* \* \* \*